(12) United States Patent
Remaker

(10) Patent No.: US 8,116,442 B2
(45) Date of Patent: Feb. 14, 2012

(54) METHOD AND APPARATUS FOR AUDIO CONFERENCE BRIDGE INITIATED REMOTE DEVICE MUTING

(75) Inventor: Phillip A. Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1526 days.

(21) Appl. No.: 11/001,368

(22) Filed: Nov. 30, 2004

(65) Prior Publication Data

US 2006/0114884 A1   Jun. 1, 2006

(51) Int. Cl.
*H04M 3/42* (2006.01)
*H04L 12/16* (2006.01)
*H04Q 11/00* (2006.01)

(52) U.S. Cl. ......... 379/202.01; 379/203.01; 379/204.01; 370/260; 370/261

(58) Field of Classification Search .................. 370/352, 370/260, 401; 379/202, 203, 204
See application file for complete search history.

(56) References Cited

U.S. PATENT DOCUMENTS

| | | | | |
|---|---|---|---|---|
| 5,913,062 A | * | 6/1999 | Vrvilo et al. | 719/321 |
| 6,243,454 B1 | * | 6/2001 | Eslambolchi | 379/202.01 |
| 6,735,193 B1 | * | 5/2004 | Bauer et al. | 370/352 |
| 7,058,026 B1 | * | 6/2006 | Hera et al. | 370/265 |
| 2003/0058806 A1 | * | 3/2003 | Meyerson et al. | 370/260 |
| 2003/0058844 A1 | * | 3/2003 | Sojka et al. | 370/352 |
| 2003/0194072 A1 | * | 10/2003 | MacNamara et al. | 379/202.01 |

* cited by examiner

*Primary Examiner* — Ahmad Matar
*Assistant Examiner* — Nafiz E Hoque
(74) *Attorney, Agent, or Firm* — Brinks Hofer Gilson & Lione

(57) ABSTRACT

Method and apparatus for providing an audio conference bridge initiated remote device muting are disclosed. In a preferred embodiment, a conference bridge is configured to detect a remote mute request from a remote Voice over Internet Protocol (VoIP) device, such as a VoIP telephone. Responsive to this request, the conference bridge sends an indication to the remote VoIP device to cease transmitting audio traffic while still transmitting out-of-band DTMF data.

20 Claims, 4 Drawing Sheets

METHOD AND APPARATUS FOR AUDIO CONFERENCE BRIDGE INITIATED REMOTE DEVICE MUTING

BACKGROUND

1. Field of the Invention

The disclosure relates generally to data muting remote devices using an audio conference bridge.

2. The Prior Art

BACKGROUND

As voice over Internet Protocol (VoIP) devices become more prevalent, promoting collaboration between devices is increasingly important. One such application is conferencing callers using VoIP telephone, or calling from traditional telephones utilizing VoIP gateways.

FIG. 1 shows a block diagram of a prior art plain old telephone system (POTS) conference environment. FIG. 1 shows POTS telephones A, B, and C coupled to a conventional conference bridge 120 through the public switched telephone network (PSTN) 110 and multiplexed lines 125, typically T1 or E1 lines. The signals from the lines 125 are typically presented to a mixer 130 for mixing and presentation back to the conference participants.

Typically, audio from all lines 125 enters the bridge 120, including any ambient noise on the line. Users may desire to mute their station, and may do so by sending a "mute" command, such as "#5, or *6", to the bridge. In prior art systems, the audio from the muted station still reaches the bridge, but is dropped before presentation to the mixer.

While the above scenario works well in legacy analog environments, a problem arises in VoIP systems.

FIG. 2 is prior art diagram of a VoIP system 200. The system 200 includes a VoIP device 210 coupled to an IP network 220, such as the Internet, through a router 215. Typically, the router is coupled to IP network 220 through a low-bandwidth connection, such a home or small business DSL link.

A call from the VoIP device 210 is then received by an enterprise device 225 that includes a conference bridge 225. Gateway 235 in this scenario comprises a device that receives a VoIP signal and presents it as a POTS signal, either in analog (e.g. FXO, FXS) or digital (e.g., T1, E1) form, to a destination device.

As will be appreciated, device 210 can be replaced by a combination of a traditional phone (or traditional PSTN connections) connected to a device that converts that PSTN device to IP.

In typical operation, the VoIP device 210 calling into the conference bridge may send an out-of-band signal, typically a DTMF signal such as the key stokes "#5", to cause the bridge to mute the caller. This process will be referred to herein as a remote mute, as the mute is requested by a remote device.

In the case of FIG. 2 where the remote device is a VoIP device, the remote mute request will cause the bridge to mute the call to other callers participating in the conference. This functionality is useful in devices that do not have a local mute functionality, or in devices that cannot control the audio of the call, such as cell phone reception noise, ambient noise, or a device providing music on hold.

However, after the VoIP device has requested a remote mute, the device is still sending packets that flood the network and are ultimately discarded by the bridge.

Hence there is a need for a remote muting functionality that causes the remote device to cease sending packets when a remote mute is requested of a conference bridge.

BRIEF DESCRIPTION OF THE DRAWING FIGURES

DETAILED DESCRIPTION

Figure 1:
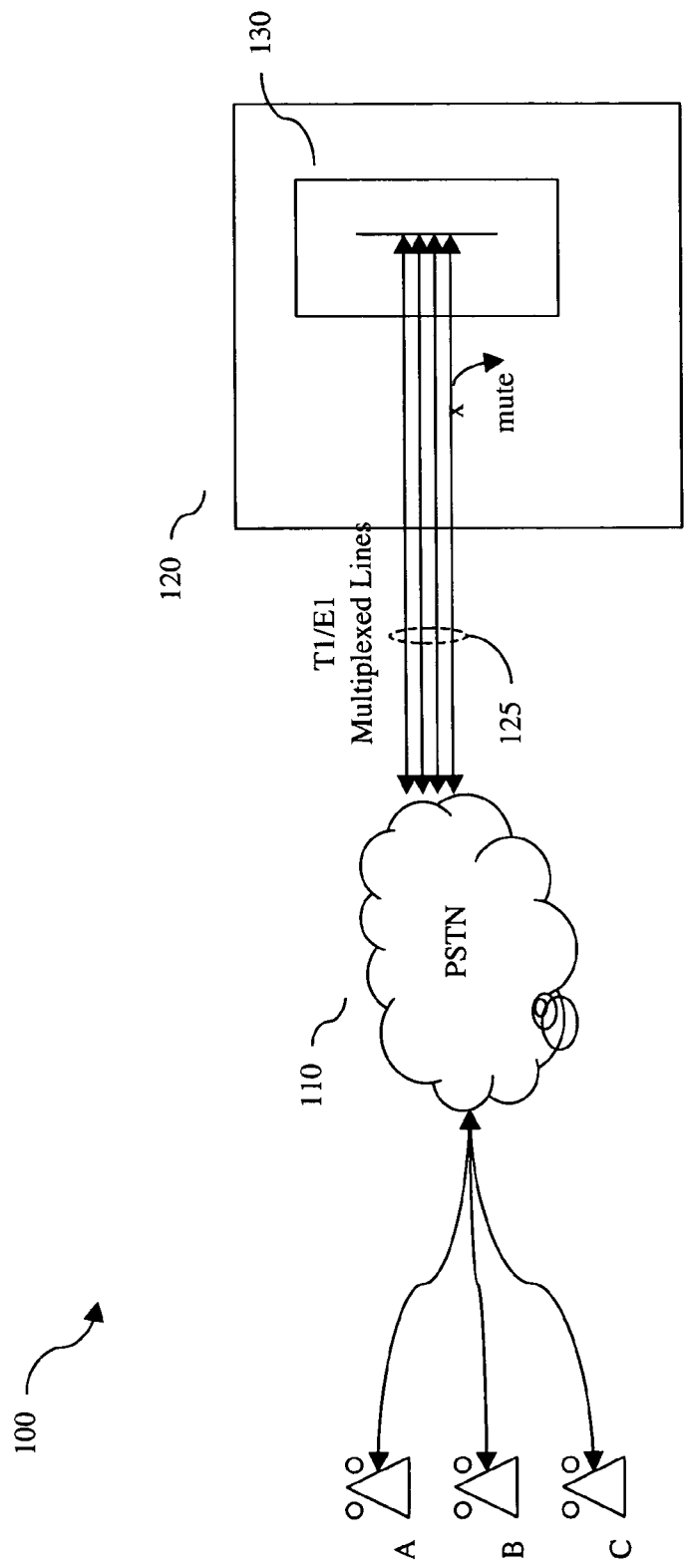
FIG. 1 is a conceptual block diagram of a prior art POTS system.
Figure 2:
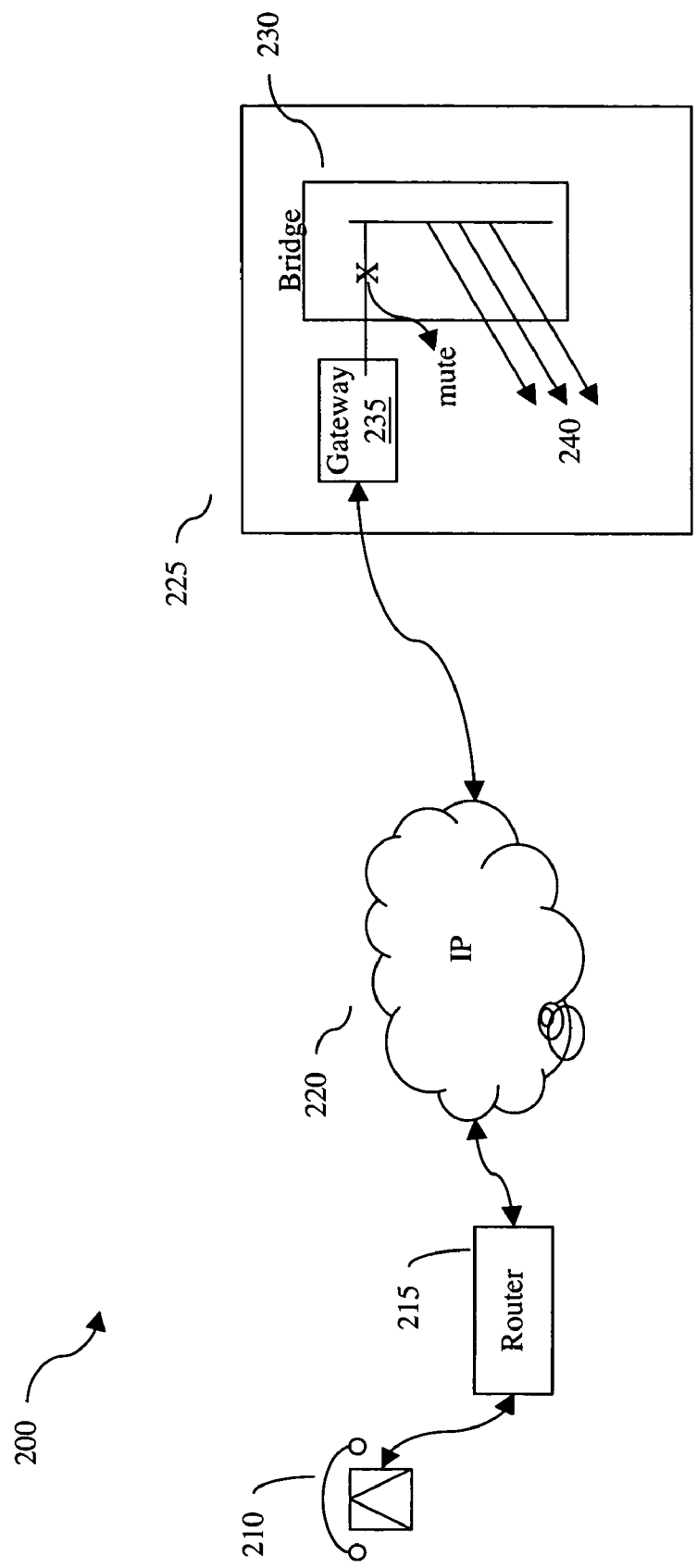
FIG. 2 is a conceptual block diagram of a prior art VoIP system.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure provides for causing a remote device to cease audio traffic from being transmitted while the device is in a mute state. A conference bridge is configured to detect a mute request from a remote VoIP device ("remote mute request"). When such a request is detected, the bridge may then send an indication to the remote device to cease transmitting further audio traffic while continuing to send out-of-band DTMF data, or any other signaling appropriate to toggle the mute mode, or any other features of the conference bridge.

The present disclosure thereby provides the benefit of saving network bandwidth towards the conference bridge that is wasted using prior art methods.

Figure 3:
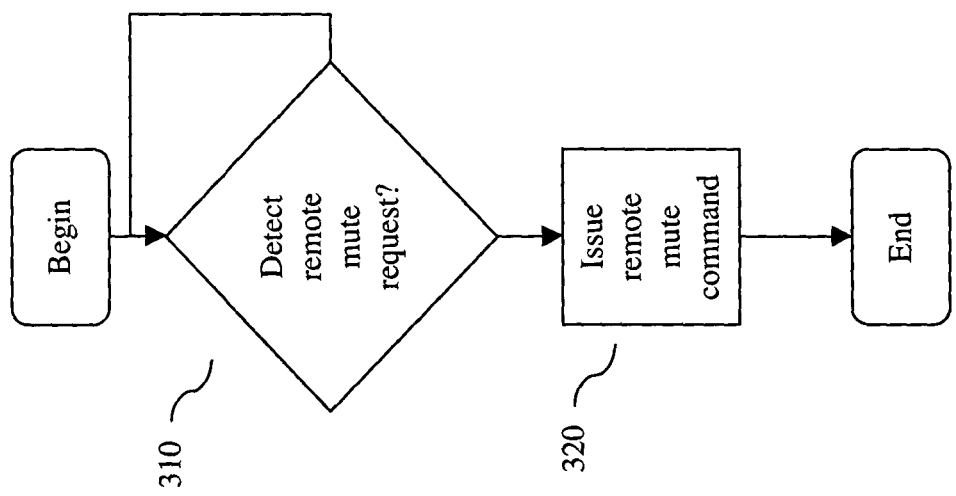
FIG. 3 is a flow diagram of a method for providing conference bridge initiated remote muting in accordance with the teachings of this disclosure.

FIG. 3 is a flow diagram of a method for providing conference bridge initiated remote muting in accordance with the teachings of this disclosure. The process of FIG. 3 begins in act 310, where a conference bridge detects a mute request from a remote device. In act 320, responsive to a detection of a remote mute request, the bridge then causes the remote device to cease transmitting audio traffic by sending an appropriate command to mute that device.

As will be appreciated, logic may also be provided to issue a command to cease muting, and ensure that the mute commands issued in accordance with this disclosure do not prevent the "unmute" commands from passing through to remote devices.

Figure 4:
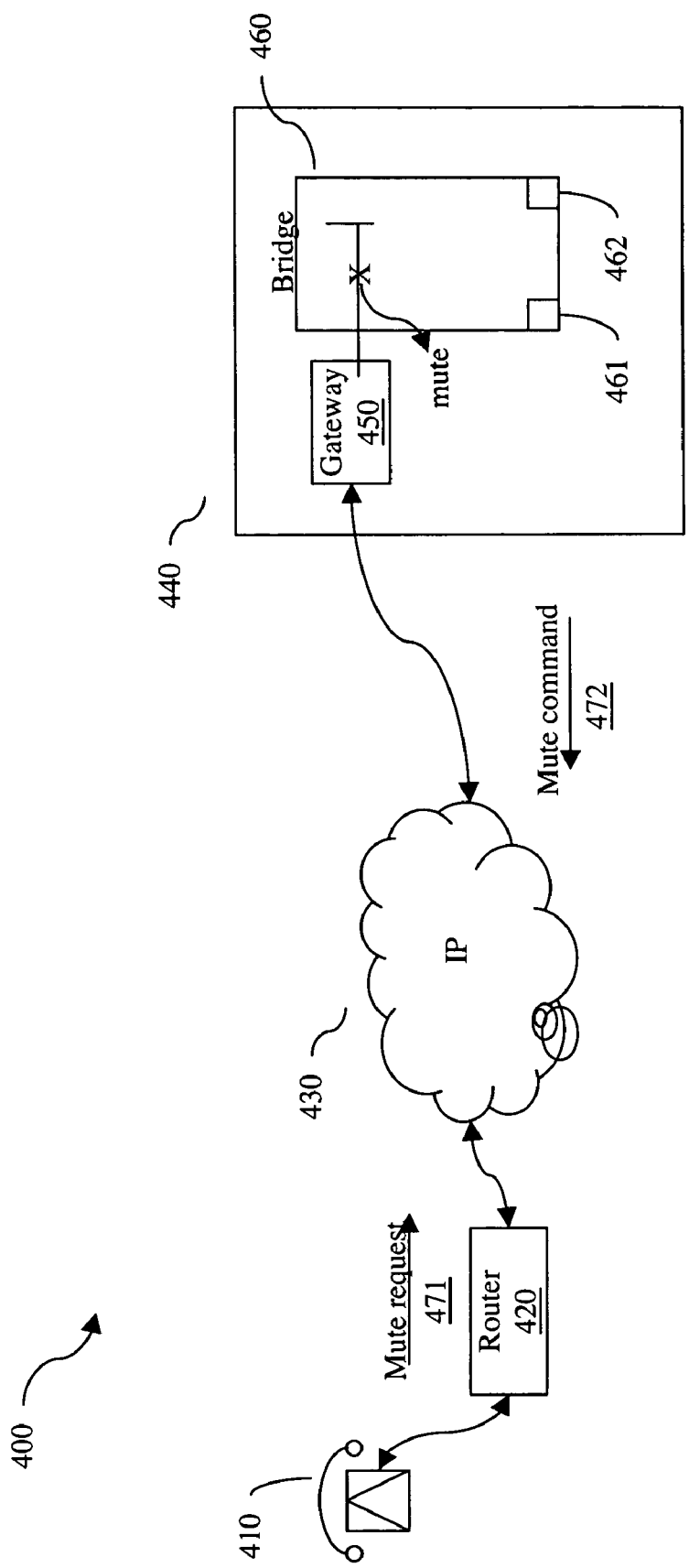
FIG. 4 is a conceptual block diagram of a VoIP system configured in accordance with the teachings of this disclosure to provide conference bridge initiated remote muting.

FIG. 4 is a conceptual diagram of a VoIP conferencing system 400 for performing embodiments of this disclosure. The system 400 includes one or more remote devices 410 participating in a conference call using the system. The remote device may comprise a VoIP telephone, or a POTS phone operating through an IP telephony gateway, or a multiplicity of telephones operating through a VoIP gateway, switch, or PBX. The remote device may comprise any device capable of sending audio traffic through an IP network, such as a "soft" VoIP phone operating in a host computer.

The device 410 may be coupled to the IP network 430 through a conventional router 420, and ultimately to the enterprise endpoint 440 hosting the call. The endpoint 440 may include a VoIP gateway 450 coupled to a conference bridge 460. The conference bridge may include a processor 461 and associated memory 462 for performing embodiments of this disclosure.

Additionally, it is contemplated that the enterprise device may directly terminate VoIP calls in one embodiment. Such a connection would be a completely virtual link.

In operation, the remote device is participating in a conference call hosted by the endpoint. To request to be transferred to mute state, the remote device will send a request signal 471, typically a keystroke pattern such as "#5", a "programmable" function key on a VoIP phone, or an equivalent command. This signal 471 may comprise an out-of-band DTMF signal.

In a preferred embodiment, the gateway 450 is configured to detect signal 471 and recognize it as a remote mute request. Responsive to the detection of signal 471, the bridge then generates a mute command 472 that is transmitted back to the remote device requesting the mute. In a preferred embodiment, the command 472 contains information that will cause the requesting remote device to cease transmitting audio, but continue transmitting out-of-band DTMF data. Command 472 may apply only to the media stream associated with the single IP telephony device which is requesting the mute.

It is contemplated that the teachings of this disclosure will be applicable to different protocols and associated scenarios. For example, some conference bridges may be configured to operate using native VoIP. In such cases, it is contemplated that the appropriate H.323 or SIP mute command will be generated directly by the bridge when sending the mute command.

Alternatively, it is contemplated that the bridge may be connected as a digitally multiplexed POTS link such as Integrated Digital Services Network Primary Rate Interface (ISDN PRI) coupled directly to a VoIP device. In such cases, it is contemplated that the bridge may generate an appropriate out-of-band Q.931 signal back to the remote muted channel that includes instructions to the upstream gateway to switch to mute mode for that channel. In such a case, a PRI-to-VoIP gateway may be provided in the endpoint.

Alternatively, mechanisms for providing non-standard signaling through other forms of POTS networks may be employed herein. For example, in the case where a VoIP gateway is on each edge of the connection, there may be reserved DTMF sequences by which the local POTS attached bridge may signal to the local VoIP gateway to tell the remote VoIP gateway to mute a channel.

The DTMF signals of this disclosure are preferably transmitted out-of-band to prevent in-band DTMF signaling from being broken. It is contemplated that a wide variety of DTMF forms may be employed in the present disclosure, such as signaled DTMF (H.323 or SIP KPML), and forms compliant with RFC2833.

It can now be seen that the present disclosure provides bandwidth savings in many scenarios, such as in cases where a participant in a conference call desires primarily to listen in, especially over bandwidth-constrained asymmetric DSL broadband links. For example, one possible application of the teachings disclosed herein is in an on-line education session, where many students are primarily listening in. Significant upstream packet traffic can be avoided by remote muting the student's telephone devices in accordance with this disclosure. In the case of prior art systems, significant upstream traffic would be transmitted to the bridge, only to be discarded.

Alternatively, it is contemplated that the teachings of the present disclosure may enhance the security of remote devices. In non-SRTP environments, the remote device user may not realize that live audio traffic is being transmitted to the bridge when their phone is in a remote mute state. Hence, by causing the remote device to cease audio packet traffic, the conference bridge initiated remote muting of this disclosure can enhance security by ensuring that unintended audio traffic is not being transmitted such that it can be snooped by others.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for providing audio conference bridge initiated remote device muting, said method comprising:
    hosting, by a conference bridge, two-way communication with a first remote device utilizing Voice over Internet Protocol (VoIP) and two-way communication with a second remote device;
    detecting, by said conference bridge, a mute request from said first remote device; and
    sending a cease transmitting audio command from said conference bridge to said first remote device, which transmitted the mute request,
    wherein the conference bridge maintains the two-way communication with the second remote device after sending the indication to the first remote device,
    wherein the first remote device is configured to stop transmitting audio traffic based on the cease transmitting audio command,
    wherein said first remote device continues to transmit out-of-band traffic while ceasing to transmit audio traffic.

2. The method of claim 1, wherein said out-of-band traffic comprises DTMF data.

3. The method of claim 2, wherein said first remote device comprises a VoIP telephone.

4. The method of claim 2, wherein said second remote device comprises a Plain Old Telephone System (POTS) telephone coupled to said conference bridge through a VoIP gateway.

5. The method of claim 2, wherein said first remote device is coupled to a remote VoIP gateway, and said first remote device is muted through a local VoIP gateway coupled to said remote VoIP gateway through a network.

6. An apparatus for providing audio conference bridge initiated remote device muting comprising:
   a conference bridge, said conference bridge configured to:
     host two-way communication with a first remote device using Voice over Internet Protocol (VoIP) device and two-way communication with a second remote device;
     detect a mute request from the first remote device; and
     send a command from the conference bridge to said first remote device, which transmitted the mute request,
     wherein the command instructs the first remote device to cease transmitting audio traffic while continuing to transmit out-of-band traffic,
     wherein the conference bridge maintains the two-way communication with the second remote device after sending the indication to the first remote device.

7. The apparatus of claim 6, wherein the out-of-band traffic includes DTMF data.

8. The apparatus of claim 7, wherein said first remote device comprises a VoIP telephone.

9. The apparatus of claim 7, wherein said second remote device comprises a Plain Old Telephone System (POTS) telephone coupled to said conference bridge through a VoIP gateway.

10. The apparatus of claim 7, wherein said first remote device is coupled to a remote VoIP gateway, and said first remote device is muted through a local VoIP gateway coupled to said remote VoIP gateway through a network.

11. An apparatus for providing audio conference bridge initiated remote device muting comprising:
    means for hosting, by a conference bridge, two-way communication with a first remote device including Voice over Internet Protocol (VoIP) and two-way communication with a second remote device;
    means for detecting, by said conference bridge, a mute request from the first remote device; and
    means for sending, by said conference bridge, an indication to said first remote device, which transmitted the mute request, to cease transmitting audio traffic, wherein the conference bridge maintains the two-way communication with the second remote device after sending the indication to the first remote device,
    wherein said first remote device continues to transmit out-of-band traffic while ceasing to transmit audio traffic.

12. The apparatus of claim 11, wherein said out-of-band traffic comprises DTMF data.

13. The apparatus of claim 12, wherein said second remote device comprises a Plain Old Telephone System (POTS) telephone coupled to said conference bridge through a VoIP gateway means.

14. The apparatus of claim 12, wherein said first remote device is coupled to a remote VoIP gateway means, and said first remote device is muted through a local VoIP gateway means coupled to said remote VoIP gateway means through a network.

15. A non-transitory_program storage device readable by a machine, tangibly embodying a program of instructions executable by the machine to perform a method for providing audio conference bridge initiated remote device muting, said method comprising:
    hosting, by a conference bridge, two-way communication with a first remote Voice over Internet Protocol (VoIP) device and two-way communication with a second remote VoIP device;
    detecting, by said conference bridge, a mute request from the first remote VoIP device; and
    sending, by said conference bridge, an indication to said first remote VoIP device, which transmitted the mute request, to cease transmitting audio traffic, wherein the conference bridge maintains the two-way communication with the second remote VoIP device after sending the indication to the first remote VoIP device,
    wherein said first remote VoIP device continues to transmit out-of-band traffic while ceasing to transmit audio traffic.

16. The method of claim 15, wherein said out-of-band traffic comprises DTMF data.

17. The method of claim 16, wherein said first remote VoIP device comprises a VoIP telephone.

18. The method of claim 16, wherein said first remote VoIP device is coupled to a remote VoIP gateway, and said first remote VoIP device is muted through a local VoIP gateway coupled to said remote VoIP gateway through a network.

19. The method of claim 1, wherein the two-way communication with the first remote device occurs at a first bandwidth before sending the cease transmitting audio command and at a second bandwidth after sending the cease transmitting audio command, wherein the first bandwidth exceeds the second bandwidth.

20. The method of claim 1, wherein after the cease transmitting audio command is received, upstream traffic is reduced thereby providing bandwidth savings.

* * * * *